United States Patent
Munkberg et al.

(10) Patent No.: US 11,244,226 B2
(45) Date of Patent: Feb. 8, 2022

(54) SYSTEMS AND METHODS FOR TRAINING NEURAL NETWORKS WITH SPARSE DATA

(71) Applicant: NVIDIA Corporation, Santa Clara, CA (US)

(72) Inventors: Carl Jacob Munkberg, Malmö (SE); Jon Niklas Theodor Hasselgren, Bunkeflostrand (SE); Jaakko T. Lehtinen, Helsinki (FI); Timo Oskari Aila, Tuusula (FI)

(73) Assignee: NVIDIA Corporation, Santa Clara, CA (US)

( * ) Notice: Subject to any disclaimer, the term of this patent is extended or adjusted under 35 U.S.C. 154(b) by 928 days.

(21) Appl. No.: 15/881,632

(22) Filed: Jan. 26, 2018

(65) Prior Publication Data

US 2018/0357537 A1    Dec. 13, 2018

Related U.S. Application Data

(60) Provisional application No. 62/518,435, filed on Jun. 12, 2017.

(51) Int. Cl.
*G06N 3/08*   (2006.01)
*G06N 5/04*   (2006.01)

(52) U.S. Cl.
CPC ............... *G06N 3/08* (2013.01); *G06N 3/084* (2013.01); *G06N 5/04* (2013.01)

(58) Field of Classification Search
CPC ............ G06N 3/08; G06N 3/084; G06N 5/04
See application file for complete search history.

(56) References Cited

U.S. PATENT DOCUMENTS

| | | |
|---|---|---|
| 5,390,285 A | 2/1995 | Wood |
| 5,444,796 A | 8/1995 | Ornstein |

(Continued)

FOREIGN PATENT DOCUMENTS

| | | |
|---|---|---|
| CN | 105912990 A | 8/2016 |
| CN | 106156003 A | 11/2016 |

(Continued)

OTHER PUBLICATIONS

Vincent et al., Efficient Exact Gradient Update for training Deep Networks with Very Large Sparse Targets, 2015, URL: https://arxiv.org/pdf/1412.7091.pdf (Year: 2015).*

(Continued)

*Primary Examiner* — Alan Chen
(74) *Attorney, Agent, or Firm* — Davis Wright Tremaine LLP

(57) ABSTRACT

A method, computer readable medium, and system are disclosed for training a neural network model. The method includes the step of selecting an input vector from a set of training data that includes input vectors and sparse target vectors, where each sparse target vector includes target data corresponding to a subset of samples within an output vector of the neural network model. The method also includes the steps of processing the input vector by the neural network model to produce output data for the samples within the output vector and adjusting parameter values of the neural network model to reduce differences between the output vector and the sparse target vector for the subset of the samples.

20 Claims, 14 Drawing Sheets

(56) References Cited

U.S. PATENT DOCUMENTS

| | | | |
|---|---|---|---|
| 6,067,535 | A | 5/2000 | Hobson et al. |
| 6,108,648 | A | 8/2000 | Lakshmi et al. |
| 6,128,609 | A | 10/2000 | Rose |
| 7,401,056 | B2 | 7/2008 | Kam |
| 7,653,605 | B1 | 1/2010 | Jackson |
| 8,700,552 | B2 | 4/2014 | Yu et al. |
| 8,788,444 | B2 | 7/2014 | Ball et al. |
| 9,633,306 | B2 | 4/2017 | Liu et al. |
| 10,147,442 | B1 * | 12/2018 | Panchapagesan ..... G10L 15/063 |
| 2012/0213429 | A1 | 8/2012 | Vasudevan et al. |
| 2014/0072242 | A1 | 3/2014 | Wei et al. |
| 2014/0156575 | A1 | 6/2014 | Sainath et al. |
| 2016/0019459 | A1 | 1/2016 | Audhkhasi |
| 2016/0307482 | A1 | 10/2016 | Huang et al. |
| 2017/0024642 | A1 | 1/2017 | Xiong et al. |
| 2017/0154279 | A1 | 6/2017 | Aharonov et al. |
| 2017/0293659 | A1 | 10/2017 | Huang |
| 2018/0121768 | A1 * | 5/2018 | Lin ..................... G06K 9/4628 |

FOREIGN PATENT DOCUMENTS

| | | |
|---|---|---|
| CN | 106355248 A | 1/2017 |
| CN | 106372402 A | 2/2017 |
| CN | 106650653 A | 5/2017 |
| CN | 106682734 A | 5/2017 |

OTHER PUBLICATIONS

Zhang et al., Single-Image Crowd Counting via Multi-Column Convolutional Neural Network, 2016, URL: https://ieeexplore.ieee.org/stamp/stamp.jsp?tp=&arnumber=7780439 (Year: 2016).*

IEEE Computer Society, "IEEE Standard 754-2008 (Revision of IEEE Standard 754-1985): IEEE Standard for Floating-Point Arithmetic," The Institute of Electrical and Electronics Engineers, Inc., Aug. 29, 2008, 70 pages.

Bourely et al., "Sparse Neural Networks Topologies," Cornell University Library, Jun. 2017, pp. 1-12 retrieved from https://arxiv.org/abs/1706.05683.

Krishan, "Autoencoders: Sparse and Deep," From Data to Decisions, Jul. 7, 2016, pp. 1-5 retrieved from https://iksinc.online/2016/07/07/autoencoders/.

Wei et al., "Minimal Effort Back Propagation for Convolutional Neural Networks," ArXiv, 2017, pp. 1-8 retrieved from https://arxiv.org/pdf/1709.05804.pdf.

Srinivas et al., "Training Sparse Neural Networks," IEEE Conference on Computer Vision and Pattern Recognition Workshops, Aug. 24, 2017, pp. 138-145.

Lehtinen et al., U.S. Appl. No. 15/807,401, filed Nov. 8, 2017.

German Office Action for Application No. 102018113845.8, dated Apr. 9, 2021, 12 pages.

Chinese Office Action for Application No. 201810589639.6, dated Jul. 5, 2021, 13 pages.

* cited by examiner

X̄

Y

Output = f(X̄)

SYSTEMS AND METHODS FOR TRAINING NEURAL NETWORKS WITH SPARSE DATA

CLAIM OF PRIORITY

This application claims the benefit of U.S. Provisional Application No. 62/518,435 titled "TRAINING NEURAL NETWORKS WITH SPARSE DATA," filed Jun. 12, 2017, the entire contents of which is incorporated herein by reference.

FIELD OF THE INVENTION

The present invention relates to training neural networks, and more particularly to training neural networks using sparse data.

BACKGROUND

Neural networks used for image processing are typically trained using backpropagation to match the output of the neural network model (i.e., prediction) with a target image. For example, the neural network model may be trained to upscale images, producing a high resolution image from a low resolution image or to denoise images, producing a clean output image from a noisy image. Assuming, a differentiable function g described as a neural network with a set of trainable parameters, $\Theta$, which maps an input vector $x=\{x_1, x_2, \ldots, x_n\}$, to an output vector $\hat{x}=\{\hat{x}_1, \hat{x}_2, \ldots, \hat{x}_m\}$.

$$\hat{x}=g(x,\Theta). \tag{1}$$

The neural network is trained by minimizing a loss function, $$\underset{\Theta}{\operatorname{argmin}} L(y, g(x, \Theta)), \tag{2}$$

quantifying the error between the target, $y=\{y_1, y_2, \ldots, y_m\}$, and the output of the neural network.

For image processing networks, the $L_2$ norm is often used as the loss function. It is often a major challenge to generate and store the large dataset, of input and target pairs (x, y), needed for training. For example, image processing networks are typically trained with thousands or millions of images. When training with path traced images in an offline rendering scenario, it can often take weeks to generate the reference images, and many terabytes of data storage. Computing accurate target images can be time-consuming and require significant data storage and transfer capacities. There is a need for addressing these issues and/or other issues associated with the prior art.

SUMMARY

A method, computer readable medium, and system are disclosed for training a neural network model. The method includes the step of selecting an input vector from a set of training data that includes input vectors and sparse target vectors, where each sparse target vector includes target data corresponding to a subset of samples within an output vector of the neural network model. The method also includes the steps of processing the input vector by the neural network model to produce output data for the samples within the output vector and adjusting parameter values of the neural network model to reduce differences between the output vector and the sparse target vector for the subset of the samples.

DETAILED DESCRIPTION

Rather than training a neural network using input data and dense target data, a technique is described for training a neural network using sparse target data. In one embodiment, only a selected subset of the dense target data is present. In the context of the following description dense target data includes at least one sample per pixel for image data. In contrast, sparse target data includes less than one sample per pixel for image data. In one embodiment, the subset of the dense target data is randomly selected for each sparse target vector. In another embodiment, the subset of the dense target data is selected based on some predetermined criterion. To achieve convergence during training of the neural network model, all data samples (e.g., pixels for image data) should be equally represented in the sparse target data. Importantly, only the selected subset of the dense target data needs to be generated and stored. Using sparse target data instead of dense target data can drastically reduce the time and computations needed to produce a training dataset. Therefore, the time needed to complete the entire training process may be reduced.

In one embodiment, the input data is also sparse, so that only a selected subset of the input data is generated and stored. When the input data is sparse, the selected subset of the input data should not be correlated with the selected subset of the target data—within a training data pair. Training can also be performed in real-time. For example, training can be performed as sparse input images $\bar{X}$ are received from an image capture device or rendered using computer graphics. The neural network can be trained to generate output images that accurately match the dense target images—without ever using a dense target image Y during the training process. Instead, sparse target images $\bar{Y}$ are used to train the neural network.

Figure 1A:
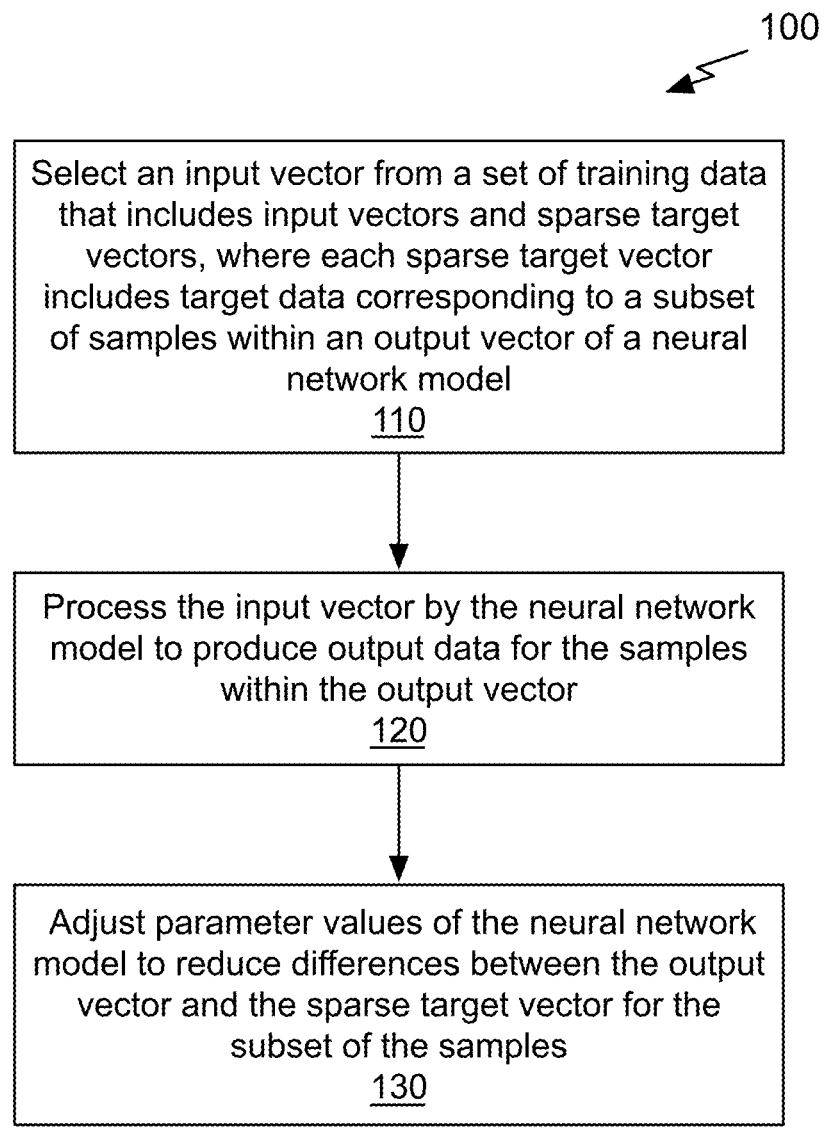
FIG. 1A illustrates a flowchart of a method for training a neural network, in accordance with one embodiment.

FIG. 1A illustrates a flowchart of a method 100 for training a neural network, in accordance with one embodiment. The method 100 is described in the context of a neural network, and the method 100 may also be performed by a program, custom circuitry, or by a combination of custom circuitry and a program. For example, the method 100 may be executed by a graphics processing unit (GPU), central processing unit (CPU), or any processor capable of performing the necessary processing operations. Furthermore, persons of ordinary skill in the art will understand that any system that performs method 100 is within the scope and spirit of embodiments of the present invention.

At step 110, an input vector is selected from a set of training data that includes dense input vectors X and sparse target vectors $\bar{Y}$, where each sparse target vector includes target data corresponding to a subset of samples within an output vector f(X) of the neural network model. A dense target vector Y includes the sparse target vector $\bar{Y}$. In one embodiment, the samples in the subset of samples are randomly selected for each sparse target vector. Using different permutations of randomly selected target data for each sparse target vector in the training data causes the neural network model to converge to the same result as when traditional training is used with dense target vectors. In contrast, a conventional dense target vector includes target data corresponding to all of the samples within the output vector of the neural network model rather than only a subset of the samples.

Importantly, across the sparse target vectors, all data samples should be equally represented. In other words, each data sample (or pixel, in the case of image processing) is equally likely to be present or missing in the sparse target vectors. For example, only odd pixels are present in half of the images for a set of sparse target vectors and only even pixels are present in the remaining half of the image for the set of sparse target vectors. In another example, blocks or regions of pixels may be missing from each sparse target vectors, as long as each pixel is equally represented in the set of sparse target vectors.

In one embodiment, the set of training data is image data. In another embodiment, the set of training data is audio data. In the context of the following description, the set of training data may include samples of signals representing any type of data. In other words, the training technique that uses sparse target vectors is domain independent.

The input vectors may be dense (X) or sparse ($\bar{X}$). However, as previously explained, obtaining dense target and/or input vectors is sometimes difficult. Importantly, if the input vectors in the training dataset are sparse, locations of samples present in the sparse input vector should not be correlated with the subset of samples present in the sparse target vector for a training pair. In other words, the subsets of samples are not correlated for a training pair ($\bar{X}$, $\bar{Y}$).

At step 120, the input vector is processed by a neural network model to produce output data for the samples within the output vector. Although the neural network model produces a dense output vector, only the subset of samples corresponding to the samples in the sparse target vectors is needed for comparison to the sparse target vector. In other words, samples in the output vector that correspond with samples missing in the sparse target vector may be discarded or need not be generated by the neural network model. The neural network model is deemed to be sufficiently trained when the output data generated for the input vector match the subset of samples within the sparse target vector or a threshold accuracy is achieved for the training dataset.

At step 130, parameter values of the neural network model are adjusted to reduce differences between the output vector and the sparse target vector for the subset of samples. In one embodiment, the differences for missing samples that are not included in the subset of samples are set to a predetermined value, such as zero, or a value indicating the missing samples match the corresponding samples in the output vector. In the context of the following description, differences are error gradients. In one embodiment, a least squares (i.e., L2) loss function is applied to the differences to adjust the parameter values. In another embodiment, a least absolute deviations (i.e., L1) loss function is applied to the differences to adjust the parameter values.

In one embodiment, a low resolution, dense, input vector X is upscaled to generate a sparse input vector $\bar{X}$. In one embodiment, the sparse input data and/or sparse target data for the training dataset is computed on-the-fly rather than storing the entire training dataset. In one embodiment, a bitmask indicates positions associated with the subset of samples that are present in the sparse target data. In one embodiment, each bit corresponding to a position that is present is set (i.e., asserted). In another embodiment, each bit corresponding to a position that is missing is set. In one embodiment, a density mask (e.g., scalar floating point values) indicates a strength of each individual sample that is present in the sparse target data. The density mask may be used to scale or modulate differences computed between the output vector and the sparse target data. These differences are used to update the network during backpropagation.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 1B:
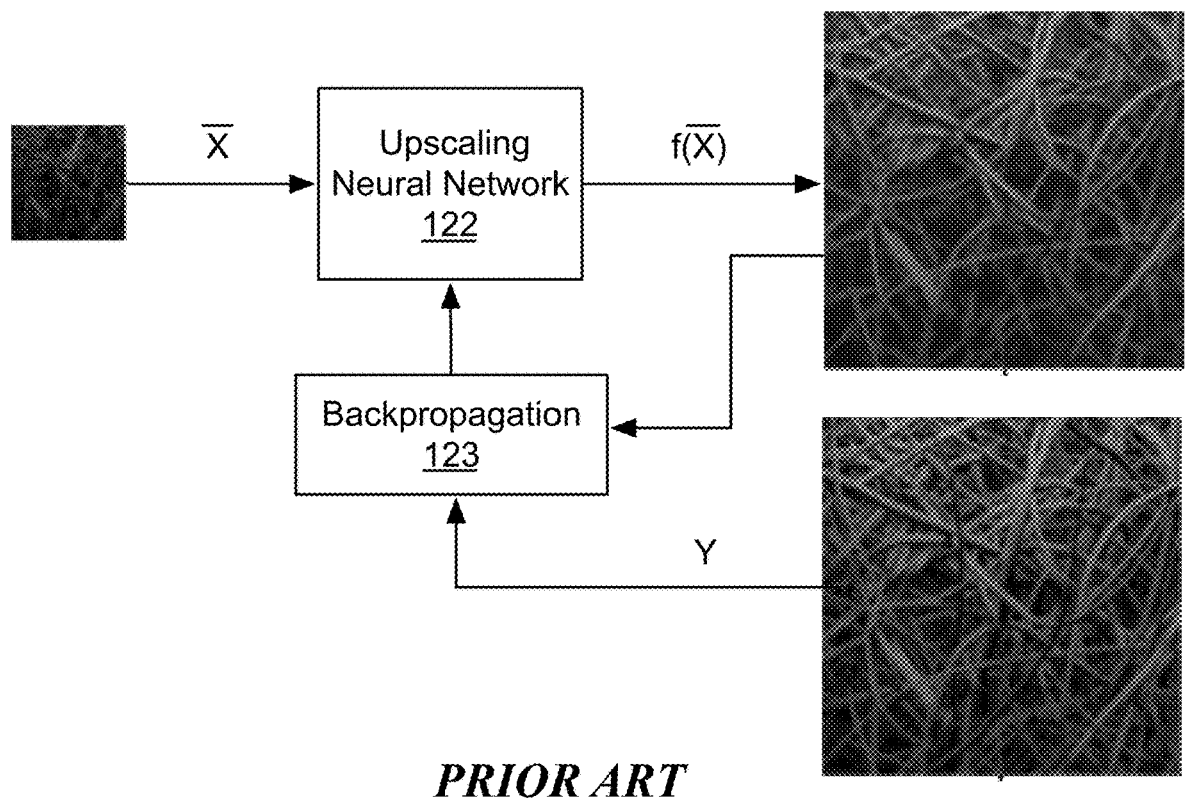
FIG. 1B illustrates a conceptual diagram of prior art neural network training using sparse input data and a ground truth training target.

FIG. 1B illustrates a conceptual diagram of prior art neural network training using sparse input data $\bar{X}$ and a ground truth training target Y. An upscaling neural network 122 is trained to upscale an input image and produce a dense output image f($\bar{X}$). For example, the input image may be 32×32 pixel resolution and the dense target image Y may be 128×128 pixel resolution. Because the input image resolution is a fourth of the dense target image in each dimension, the input image is considered to be sparse input data for a 128×128 pixel image. A backpropagation unit 123 receives the dense output image and the dense target image and adjusts parameters of the upscaling neural network 122 based on differences between the dense output image and the dense target image.

Figure 1C:
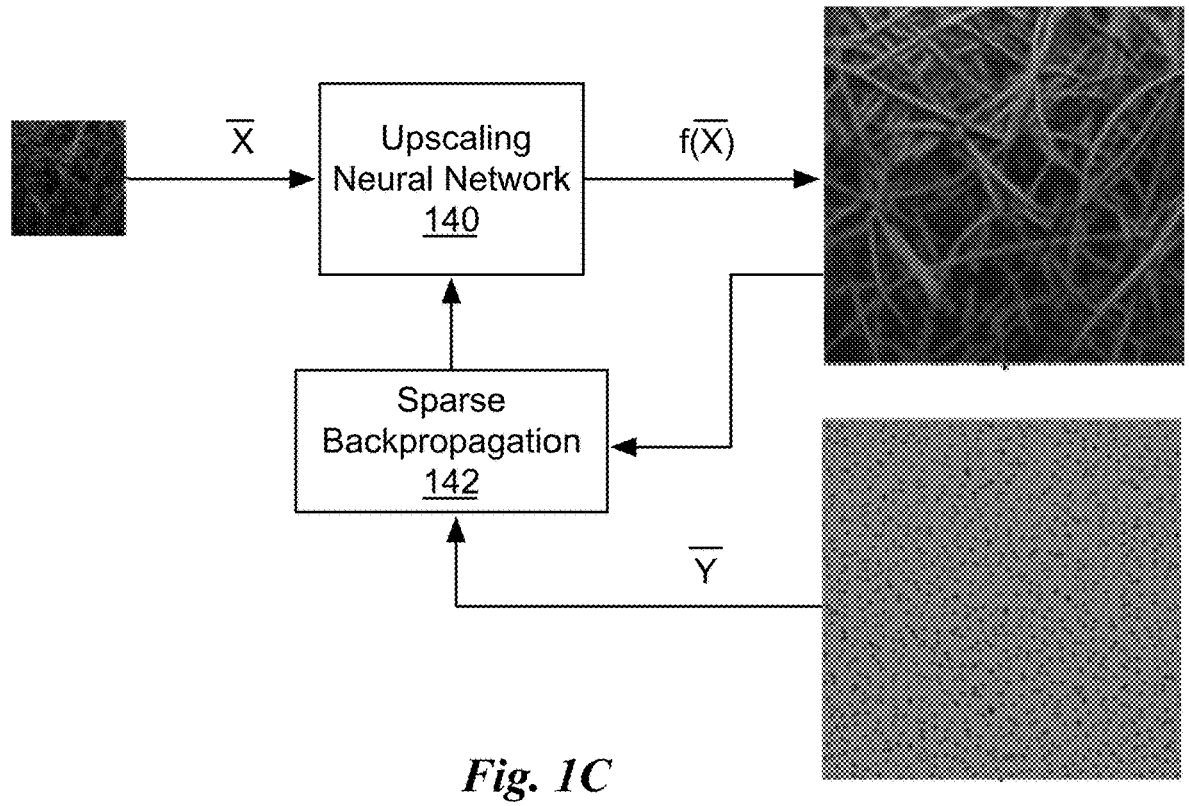
FIG. 1C illustrates a conceptual diagram of neural network training using sparse input data and sparse ground truth training targets, in accordance with one embodiment.

FIG. 1C illustrates a conceptual diagram of neural network training using sparse input data $\bar{X}$ and sparse ground truth training targets $\overline{Y}$, in accordance with one embodiment. The sparse (ground truth training) targets $\overline{Y}$ each include a subset of samples compared with the dense ground truth training targets Y. The subset of samples present in each sparse ground truth training target varies.

An upscaling neural network 140 is trained to upscale the sparse input data $\overline{X}$ and produce a dense output image f($\overline{X}$) that is an upscaled version of the input image. In contrast with the conventional training technique that uses dense target data, the training data includes sparse input vectors paired with sparse target vectors (the sparse data that is present is shown as black and white is the missing data). Importantly, within a training pair, the subset of samples (i.e., pixels) included in the sparse input data should not be correlated to the subset of samples included in the sparse target data. A sparse backpropagation unit 142 receives the dense output image and the sparse target data $\overline{Y}$ and adjusts parameters of the upscaling neural network 140.

In one embodiment, the sparse backpropagation unit 142 includes a first unit that computes a loss function and a second unit that performs backpropagation (updates the neural network weights based on the loss gradient). The loss computation performed by the first unit is modified, as described further herein, and only the sparse loss gradients are input to the second unit instead of dense loss gradients. the subsequent backpropagation operation is the same as in a conventional neural network training session, except that only the sparse loss gradients are processed instead of dense loss gradients, to produce updated weights.

In one embodiment, training the upscaling neural network 140 using the sparse target data causes the upscaling neural network 140 to converge at a similar rate compared with training the upscaling neural network 122 using the dense target image. A possible explanation is that convolution operations performed by the upscaling neural network 140 are applied equally to each sample (i.e., pixel), and thus the weights are updated with the average gradient of all pixels during backpropagation. Even the sparse target vectors contain a large enough number of samples so that the gradient can be accurately estimated.

While one motivation has been to reduce effort required to generate training target vectors, sparse target vectors may also be able to accelerate the neural network model training process by reducing the number of computations performed for each training pair—particularly when sparse input vectors are used. Sparse matrix multiplication is a well-studied field, and the computation efficiency techniques may be directly applied to neural networks as most layers (such as fully connected and convolution layers) are implemented using matrix multiplications.

Furthermore, there may be use cases where physical limitations may be circumvented by training a neural network model using sparse target vectors. For example, assume a piece of hardware can sample a signal s(t) at some limited frequency, but with configurable timing. By sampling the signal at random times, a neural network model can be effectively trained to perform up-sampling/signal prediction using a large set of sparse training data.

Figure 1D:
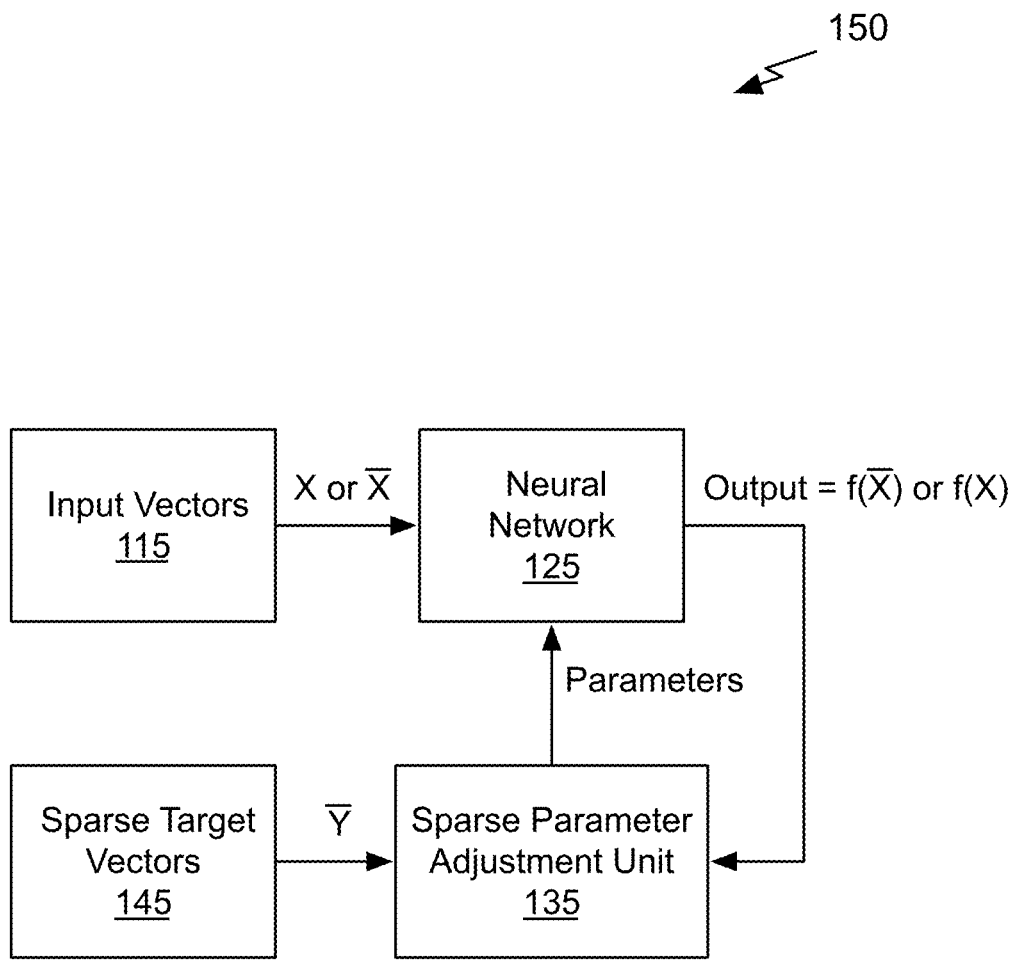
FIG. 1D illustrates a block diagram of a system for training a neural network using sparse target vectors, in accordance with one embodiment.

FIG. 1D illustrates a block diagram of a system 150 for training a neural network 125 using sparse target vectors 145, in accordance with one embodiment. Input vectors 115 may be sparse $\overline{X}$ or dense X. When the input vectors 115 are sparse, a bitmask may be used to indicate the positions of samples that are present in each input vector. Each input vector included in the input vectors 115 is paired with a sparse target vector included in the sparse target vectors 145. In one embodiment, a bitmask associated with each sparse target vector indicates positions of the samples in the subset of the samples. The positions corresponding to samples present in the subset of the samples varies for each sparse target vector in the sparse target vectors 145. In other words, at least one position in the two bitmasks for two sparse target vectors are different. When the input vectors 115 are sparse, the bitmasks for a training pair cannot be equal because the sparse input vector and sparse target vector within a training pair cannot be correlated.

During training, an input vector $\overline{X}$ or X is applied to a neural network model 125 to generate the output f($\overline{X}$) or f(X). A sparse parameter adjustment unit 135 receives both the output f($\overline{X}$) or f(X) and the sparse target vector $\overline{Y}$ that is paired with the input vector $\overline{X}$ or X that was applied to generate the output f($\overline{X}$) or f(X), respectively. The bitmask(s) for each training pair may be provided to the parameter adjustment unit 135. The parameter adjustment unit 135 is configured to adjust the parameter values to reduce differences between the output and the noisy target samples. A loss function may be computed by the parameter adjustment unit 135 to measure distances (i.e., differences or gradients) between the sparse target vectors 145 and the output vectors. The parameter adjustment unit 135 adjusts the parameters based on the distances and the target bitmask.

More specifically, a differentiable function g describes the neural network model 125 with a set of trainable parameters, $\Theta$, that map a dense input vector $X=\{x_1, x_2, \ldots, x_n\}$, to an image $\hat{x}=g(X,\Theta)$, as close as possible to a dense target Y. The neural network 125 is trained by minimizing a loss function, $$\underset{\Theta}{\operatorname{argmin}} L(\overline{Y}, g(X, \Theta)), \qquad (3)$$

where the sparse target vector $\overline{Y}$ is a subset of the dense target vector Y.

When the input vectors 115 includes sparse input vectors, the neural network 125 is trained by minimizing a loss function, $$\underset{\Theta}{\operatorname{argmin}} L(\overline{Y}, g(\overline{X}, \Theta)), \qquad (4)$$

where the sparse input vector $\overline{X}$ is a subset of the dense input vector X.

In one embodiment the loss computed for the loss function is a sum of component-wise loss terms. For example, for gray scale images a component would be a pixel value, for RGB images a component would be a color channel value, and so on. In one embodiment, the equation for the loss is a sum over all components (the loss is a single scalar value)

$$L = \sum_i \varepsilon(\overline{Y}_i, \hat{x}_i)$$

where the component loss function is $\varepsilon(x, y)$. For the $L_2$ loss, for example, the component loss function is $\varepsilon(x, y)=(x-y)^2$. In one embodiment, the gradient of the loss function is $$\frac{\partial L}{\partial \hat{x}} = \sum_i \frac{\partial \varepsilon(\overline{Y}_i, \hat{x}_i)}{\partial \hat{x}}$$

Note that each term in the sum only depends $2t$, therefore, to determine how the loss varies with respect to a single component, $$\frac{\partial L}{\partial \hat{x}_i},$$

the gradient is zero for every other term, resulting in $$\frac{\partial L}{\partial \hat{x}_i} = \frac{\partial \varepsilon(\overline{Y}_i, \hat{x}_i)}{\partial \hat{x}_i}$$

Intuitively, the gradient is a vector $$\frac{\partial L}{\partial \hat{x}_i} = \left( \frac{\partial L}{\partial \hat{x}_0}, \frac{\partial L}{\partial \hat{x}_1}, \dots, \frac{\partial L}{\partial \hat{x}_n} \right)$$

with as many components as the sparse target vector $\overline{Y}$ and output of the network $\hat{x}$.

In one embodiment, when computing the gradient $\partial L/\partial \hat{x}$, all components where $\overline{Y}$ has missing samples are set to a predetermined value, such as zero.

$$\frac{\partial L}{\partial \hat{x}_i} = \begin{cases} \frac{\partial L}{\partial \hat{x}_i} & y_i \in \overline{Y} \\ 0 & \text{otherwise} \end{cases} \quad (5)$$

When a density mask is used the gradient is computed as:

$$\frac{\partial L}{\partial \hat{x}_i} = \begin{cases} w_i \cdot \frac{\partial L}{\partial \hat{x}_i} & y_i \in \overline{Y} \\ 0 & \text{otherwise} \end{cases}$$

where $w_i$ is the density mask value for the particular component. In one embodiment, the density mask comprises floating point values between [0,1] that indicate the certainty/confidence of each target sample, with 1.0 being a fully valid sample and 0.0 a sample to completely ignore. For example, a value of 0.2 indicates a lower level of confidence when backpropagating the loss for the corresponding pixel compared with a value of 0.9.

Setting the components where $\overline{Y}$ has missing samples to a predetermined value ensures that the gradient is minimized (i.e., becomes zero) for positions where the sparse target vector is missing samples. Thus, the backpropagation process performed by the sparse parameter adjustment unit 135 will only update the parameters, $\Theta$, based on the actual data present in the sparse target vector. In one embodiment, the parameters are weights of the neural network 125. In one embodiment, the parameter values are not adjusted for each output vector, but are instead adjusted for a batch of N output vectors, where N is greater than 1. Differences (i.e., gradients) computed by the parameter adjustment unit 135 may be averaged for the N outputs before the parameter values are adjusted.

Setting the differences or gradients to a predetermined value for missing samples differs from a conventional dropout technique. The conventional dropout technique is used to set gradients to zero that are computed using a dense output vector and dense target vector. The gradients that are set to zero are selected randomly. In contrast, the gradients that are set to the predetermined value when sparse target vectors are used are not selected randomly. Instead, the gradients that are set to the predetermined value are each associated with a missing sample in the sparse target vector. The missing samples do not need to be generated or stored.

After the neural network 125 is trained, the neural network 125 may be deployed to apply the adjusted parameter values to input data and generate dense output data, such as the upscaled image output by the upscaling neural network 140 shown in FIG. 1C.

In one embodiment, the sparse target vectors 145 are also noisy and the neural network 125 is trained to produce to generate clean images. Techniques for training a neural network with noisy training data are described in U.S. patent application Ser. No. 15/807,401 titled "Systems and Methods for Training Neural Networks for Regression Without Ground Truth Training Samples," filed Nov. 8, 2017, the entire contents of which is incorporated herein by reference.

In one embodiment, the distribution of the noisy target samples relative to the latent, clean target sample is such that the latent, clean target sample is an average (i.e., mean) of the noisy target samples. For example, for a particular pixel of an image, an average of the color value of that pixel for all of the images in the noisy target samples is color value for the same pixel in the latent, clean target sample. In another embodiment, the data distribution of the noisy target samples relative to the latent, clean target sample is such that the latent, clean target sample is a most frequently occurring (i.e., median) of the noisy target samples. For example, for a particular pixel of an image, the most frequently occurring color value of that pixel for all of the images in the noisy target samples is color value for the same pixel in the latent, clean target sample.

When the ground truth target data are replaced with the noisy target samples in the sparse target vectors 145, the noise in the noisy target vectors 145 is an additional level of randomness. However, the gradients that are computed by the sparse parameter adjustment unit 135 and used to adjust the parameter values, on-average, converge towards the same adjusted parameter values when the noisy sparse target vectors 145 are used as when the ground truth target vectors (i.e., dense target vectors) are used.

While the additional level of stochasticity resulting from the noise makes training the neural network 125 more difficult, requiring more time to converge, the accuracy of the neural network 125 is similar to that of a conventionally trained neural network once the training is completed. However, the speed at which the sparse training dataset may be generated that includes the noisy target samples may offset the additional training time compared with generating a dense training dataset having the ground truth target samples.

Figure 1E:
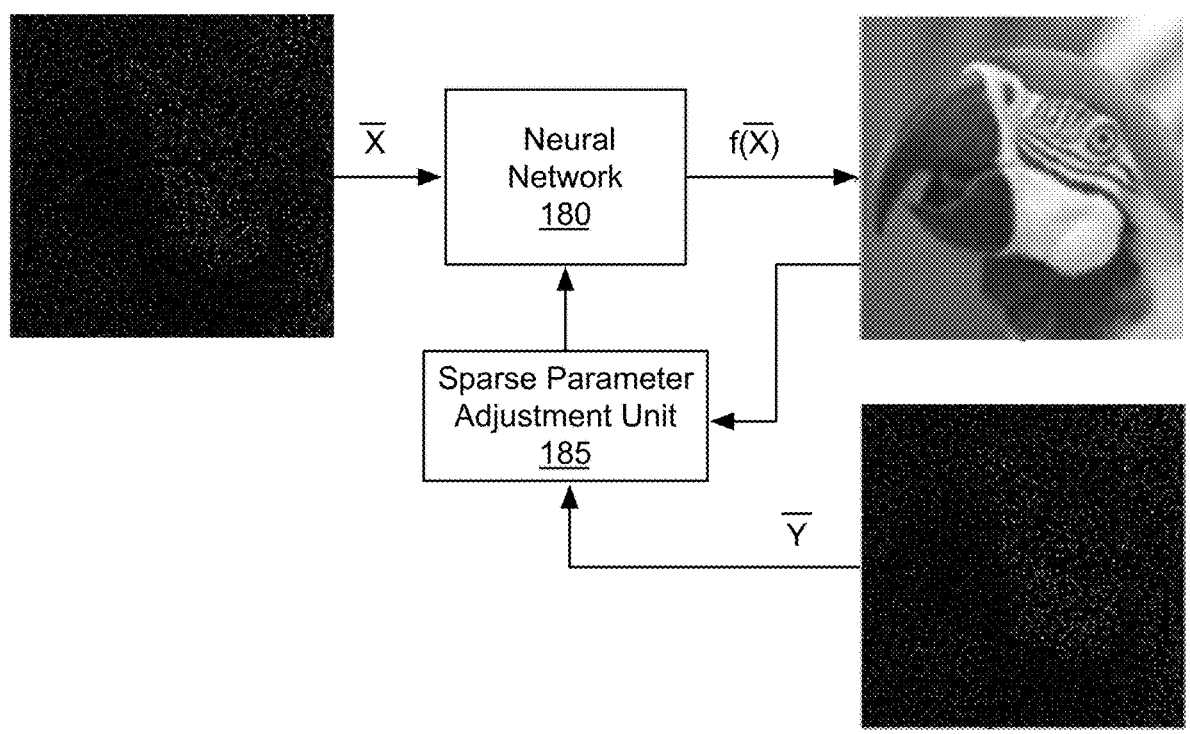
FIG. 1E illustrates another conceptual diagram of neural network training using sparse input data and sparse ground truth training targets, in accordance with one embodiment.

FIG. 1E illustrates another conceptual diagram of neural network training using sparse input data and sparse ground truth training targets, in accordance with one embodiment. Sparse input vectors $\overline{X}$ are each paired with a sparse target vector $\overline{Y}$. During training, a sparse parameter adjustment unit 185 receives the output $f(\overline{X})$ that is generated by the neural network model 180 and the sparse target vector $\overline{Y}$ paired with the input vector $\overline{X}$. The sparse parameter adjustment unit 185 computes differences between the sparse target vector $\overline{Y}$ and the output $f(\overline{X})$ for samples in the subset. The differences may be set to zero for missing samples. The parameters are adjusted based on the differences, as previously described. After the neural network 125 is trained, the neural network 125 may be deployed to apply the adjusted parameter values to input data and generate dense output data, such as the image output by the neural network 180 shown in FIG. 1E.

Within each training pair, at least one sample location in the subset of samples in the sparse input vector is different from the sample locations in the subset of samples in the sparse target vector. In other words, the subset of samples in the sparse input vector is not correlated with the sample locations in the subset of samples in the sparse target vector. Initial experiments show that training using sparse input vectors and sparse target vectors converges at a similar rate, and with similar quality compared with using dense input vectors and sparse target vectors. In one embodiment, predetermined values, such as zero, are used in place of the missing samples for the sparse input vectors. Training using sparse input vectors may be useful, e.g., when trying to apply or train a network on a process where the time of an event cannot be controlled but only measured, such as radioactive decay.

In contrast with a dense training dataset, a sparse training dataset including sparse input vectors and sparse target vectors may be produced in real-time, enabling "live training" as part of a walk-through in an interactive system. For example, as a user navigates through a three-dimensional (3D) scene, a sparse training dataset may be rendered and the neural network 125 or 180 deployed in a viewing application may be trained to generate high resolution images of the 3D scene at interactive rates. In another example, images of an environment, such as the view in front of an autonomous vehicle may be captured at low resolution, and the neural network 125 or 180 within a display may be trained to generate clean (de-noised) images of the environment at interactive rates. In another example, images of an environment, such as the view in front of an autonomous vehicle may be captured at low lighting conditions, during night time, which introduces noise at short exposure times. The neural network 125 or 180 within a display may be trained to generate clean and/or high resolution images of the environment at interactive rates. In yet another example, the view could be captured using a depth sensing device, such as a time-of-flight sensor or a LIDAR, leading to noisy estimates of the depth. The neural network 125 would learn to remove this noise. In a further example, Functional Magnetic Resonance (MRI) images captured using different, randomized slices or other subsets of the spectral representation of the volume undergoing scanning, may be fed in as a sequence to train a neural network to reconstruct high-quality volumetric images based only on the limited amount of information that corresponds to a short pulse sequences. Importantly, the technique of training the neural network 125 or 180 with sparse target samples using the method 100 is domain independent.

Figure 1F:
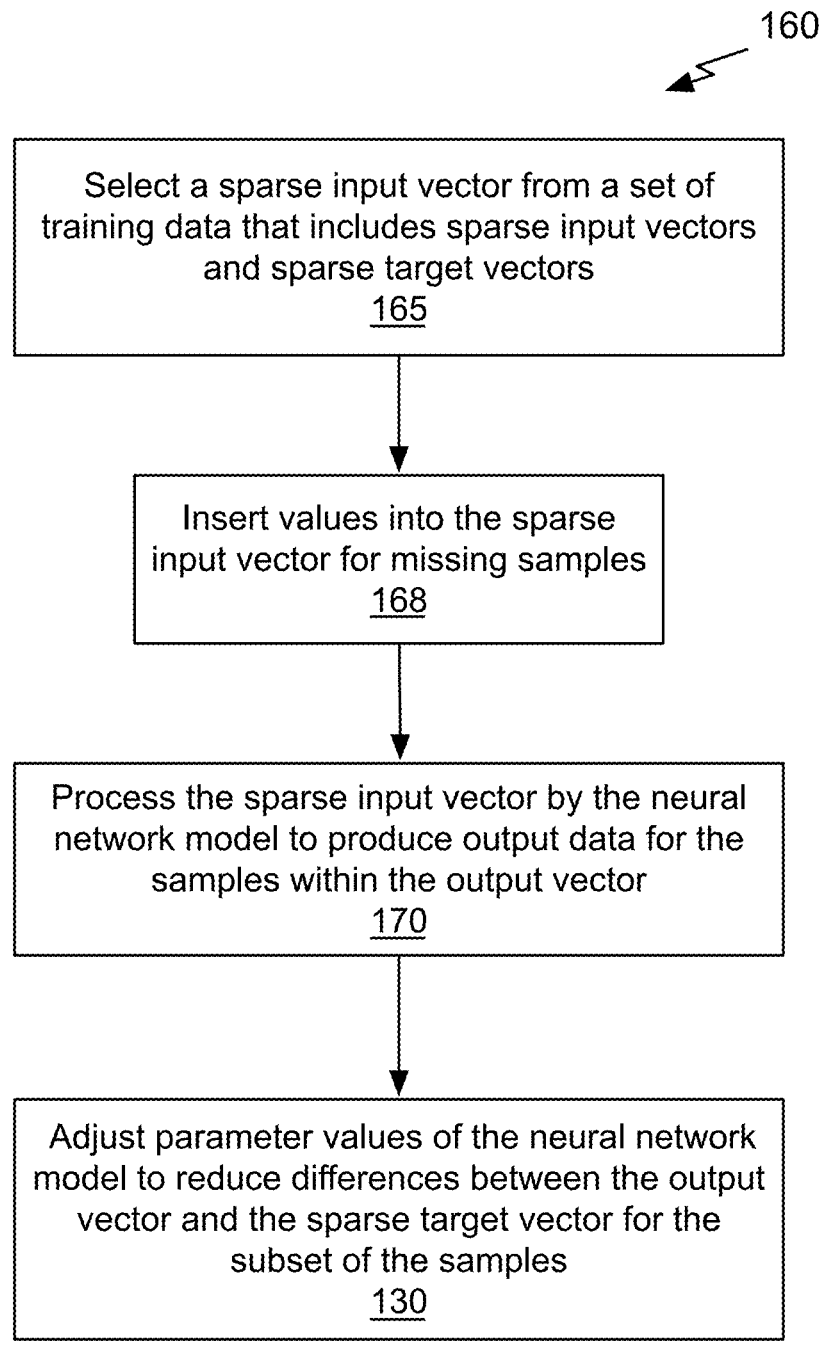
FIG. 1F illustrates a flowchart of a method for training a neural network using sparse input data and sparse ground truth training targets, in accordance with one embodiment.

FIG. 1F illustrates a flowchart of a method 160 for training a neural network, such as the neural network 125, the upscaling neural network 140, or the neural network 180, using input data and sparse ground truth training targets, in accordance with one embodiment. The method 160 is described in the context of a neural network, and the method 160 may also be performed by a program, custom circuitry, or by a combination of custom circuitry and a program. For example, the method 160 may be executed by a graphics processing unit (GPU), central processing unit (CPU), or any processor capable of performing the necessary processing operations. Furthermore, persons of ordinary skill in the art will understand that any system that performs method 160 is within the scope and spirit of embodiments of the present invention.

At step 165, a sparse input vector $\overline{X}$ is selected from a set of training data that includes sparse input vectors $\overline{X}$ and sparse target vectors $\overline{Y}$, where each sparse target vector includes target data corresponding to a subset of samples within an output vector $f(\overline{X})$ of the neural network model. In one embodiment, the samples in the subset of samples are randomly selected for each sparse input vector and sparse target vector. Locations of samples in the sparse input vector should not be correlated with the subset of samples in the sparse target vector for a training pair. In other words, the subsets of samples are not correlated within a training pair $(\overline{X}, \overline{Y})$.

At step 168, values are inserted into the sparse input vector for the missing samples. In one embodiment, the sparse input vectors are stored and transmitted in a compressed format. An input vector unit (not shown) receives the sparse input vectors in the compressed format and inserts values for the missing samples according to the bitmask. The values may be predetermined, such as zero.

At step 170, the sparse input vector is processed by the neural network model to produce output data for the samples within the output vector. Although the neural network model produces a dense output vector, only the subset of samples corresponding to the samples in the sparse target vectors is needed for comparison to the sparse target vector. In one embodiment, the neural network model may be configured to produce only the subset of samples for the output vector instead of producing the dense output vector.

At step 130, parameter values of the neural network model are adjusted to reduce differences between the output vector and the sparse target vector for the subset of samples, as previously described in conjunction with FIG. 1A. The neural network model is deemed to be sufficiently trained when the output data generated for the input vector match the subset of samples within the sparse target vector or a threshold accuracy is achieved for the training dataset.

Figure 2A:
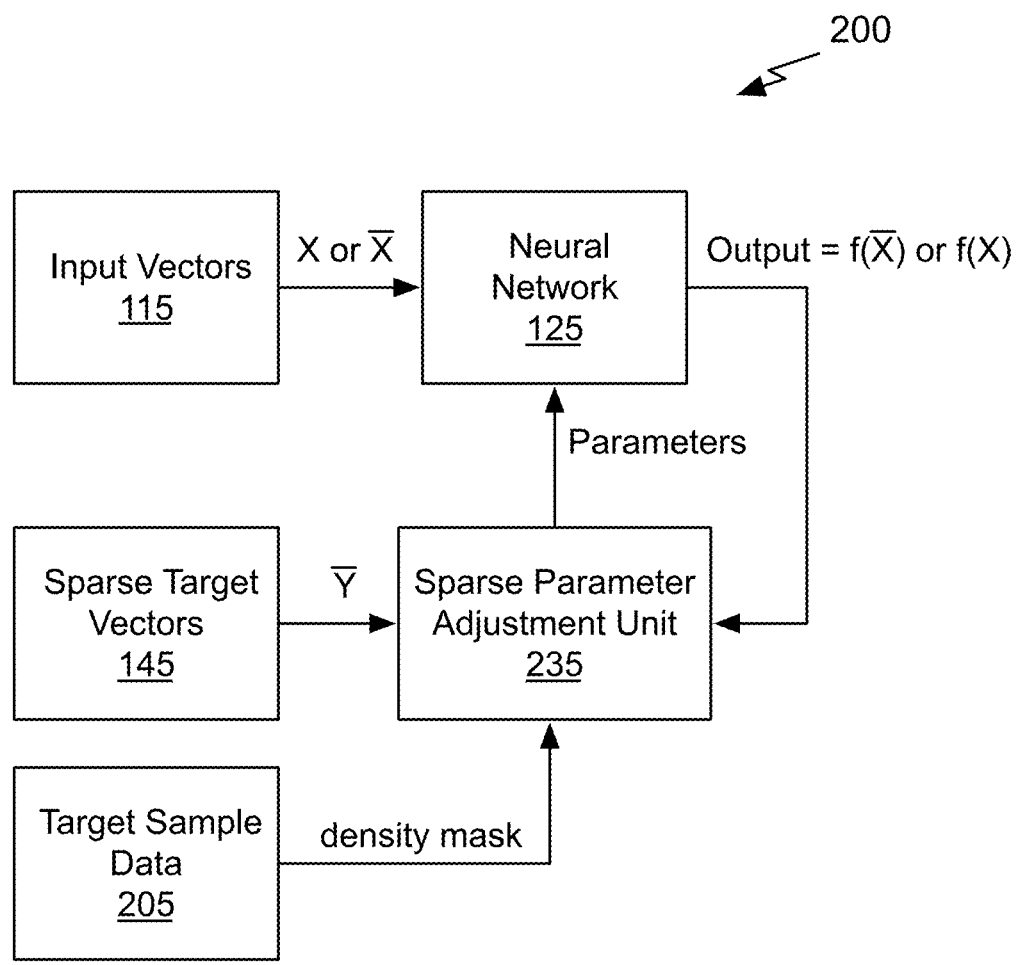
FIG. 2A illustrates a block diagram of a system for training a neural network using sparse target vectors, in accordance with one embodiment.

FIG. 2A illustrates a block diagram of a system 200 for training the neural network 125 using sparse target vectors 145, in accordance with one embodiment. Input vectors 115 may be sparse $\overline{X}$ or dense X. Each input vector included in the input vectors 115 is paired with a sparse target vector included in the sparse target vectors 145. During training, a sparse parameter adjustment unit 235 receives the output $f(\overline{X})$ or $f(X)$ that is generated by the neural network model 125 and the sparse target vector $\overline{Y}$ paired with the input vector $\overline{X}$ or X that was applied to generate the output $f(\overline{X})$ or $f(X)$, respectively. The sparse parameter adjustment unit 235 also receives a density mask corresponding to the target sample data. In one embodiment, the density mask indicates a density value or strength for each sample location for a dense target vector. A target sample data 205 may include the density mask and/or a bitmask indicating the sample locations that are present in the subset of samples. In one embodiment, a density mask is provided for each sparse target vector. The density mask indicates a density value for each sample location that is present in the subset of samples for the sparse target vector. When a density mask is provided for each sparse target vector, the bitmask is not needed and may be omitted. In one embodiment, the density masks corresponding to different sparse target vectors vary. In one embodiment, a density mask is provided that defines density values for all sample locations and bitmasks are provided for each sparse target vector to specify the subset of samples that are present in each of the sparse target vectors.

When the input vectors 115 includes dense input vectors, the neural network is trained by minimizing the loss function shown in Equation (3). When the input vectors 115 includes sparse input vectors, the neural network is trained by minimizing the loss function shown in Equation (4). The sparse parameter adjustment unit 235 computes gradients for the subset of samples and scales each gradient by the corresponding density value provided by the density mask for the sample location. The sparse parameter adjustment unit 235 then minimizes the loss function to generate updated parameters, Θ for the neural network 125.

Figure 2B:
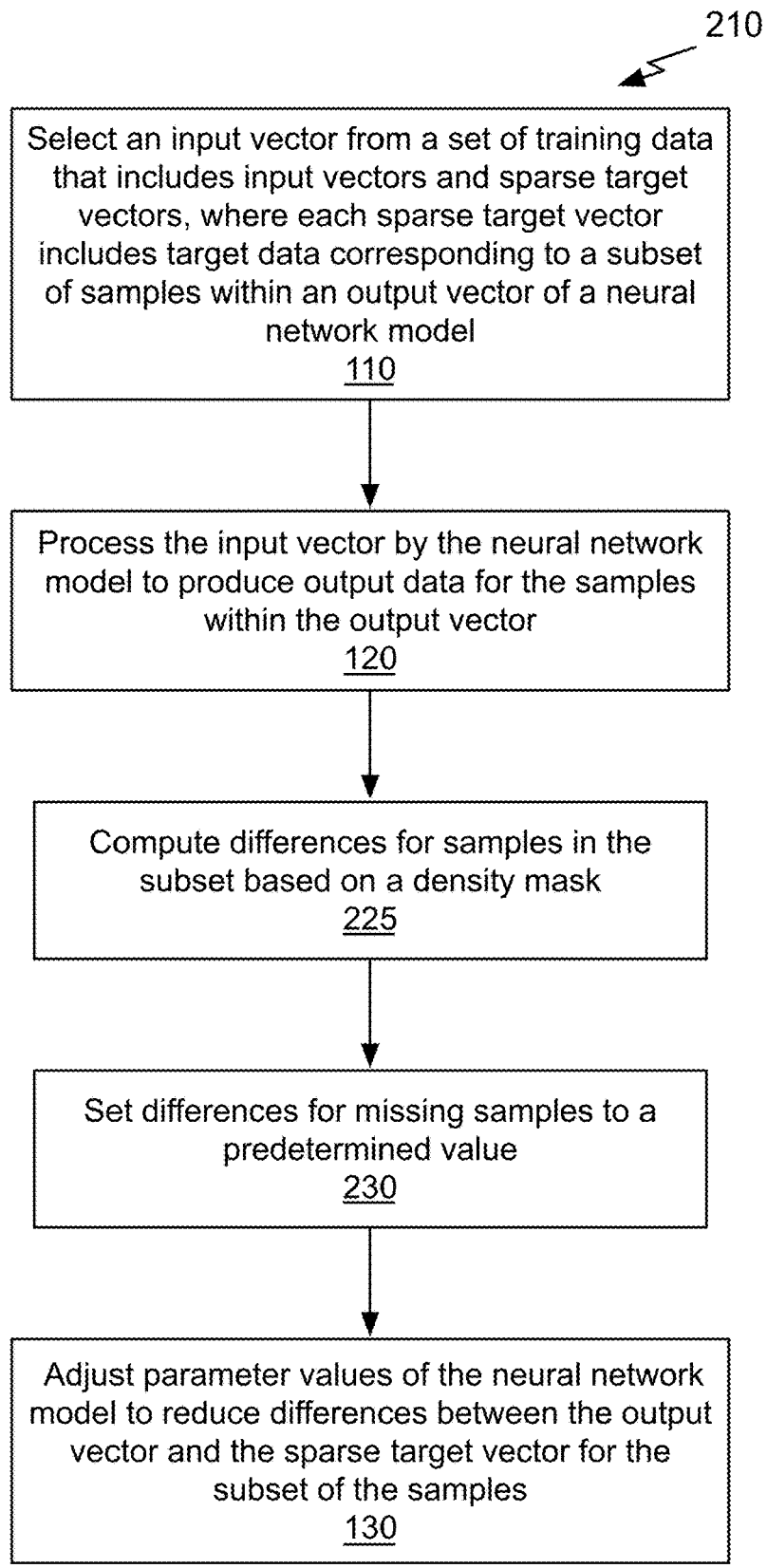
FIG. 2B illustrates another flowchart of a method for training a neural network using input data and sparse ground truth training targets.

FIG. 2B illustrates another flowchart of a method 210 for training a neural network, such as the neural network 125, the upscaling neural network 140, or the neural network 180, using input data and sparse ground truth training targets. The method 210 is described in the context of a neural network, and the method 210 may also be performed by a program, custom circuitry, or by a combination of custom circuitry and a program. For example, the method 210 may be executed by a graphics processing unit (GPU), central processing unit (CPU), or any processor capable of performing the necessary processing operations. Furthermore, persons of ordinary skill in the art will understand that any system that performs method 210 is within the scope and spirit of embodiments of the present invention.

Steps 110 and 120 are performed as previously described in conjunction with FIG. 1A. In one embodiment, when sparse input vectors are used, values are inserted into the sparse input vector for the missing samples.

At step 225, the sparse parameter adjustment unit 235 computes differences for samples that are present in the subset based on the density mask. More specifically, the sparse parameter adjustment unit 235 computes differences between the subset of samples in the output vector and the sparse target vector and then scales the differences by the density mask. In one embodiment, the density mask defines the samples that are present in the subset.

At step 230, differences for missing samples that are not present in the subset are set to a predetermined value. In one embodiment, the predetermined value is zero. In contrast with the conventional dropout technique, the differences that are set to zero are not randomly selected. Instead, the differences that are set to the predetermined value are the samples that are not in the subset and therefore, data for the samples is missing in the target vector. Therefore, an important advantage is that the missing samples do not need to be generated for the sparse target vector.

At step 130, parameter values of the neural network model are adjusted to reduce the differences (scaled by the density mask) between the output vector and the sparse target vector for the subset of samples, as previously described in conjunction with FIG. 1A. The neural network model is deemed to be sufficiently trained when the output data generated for the input vector match the subset of samples within the sparse target vector or a threshold accuracy is achieved for the training dataset.

Figure 2C:
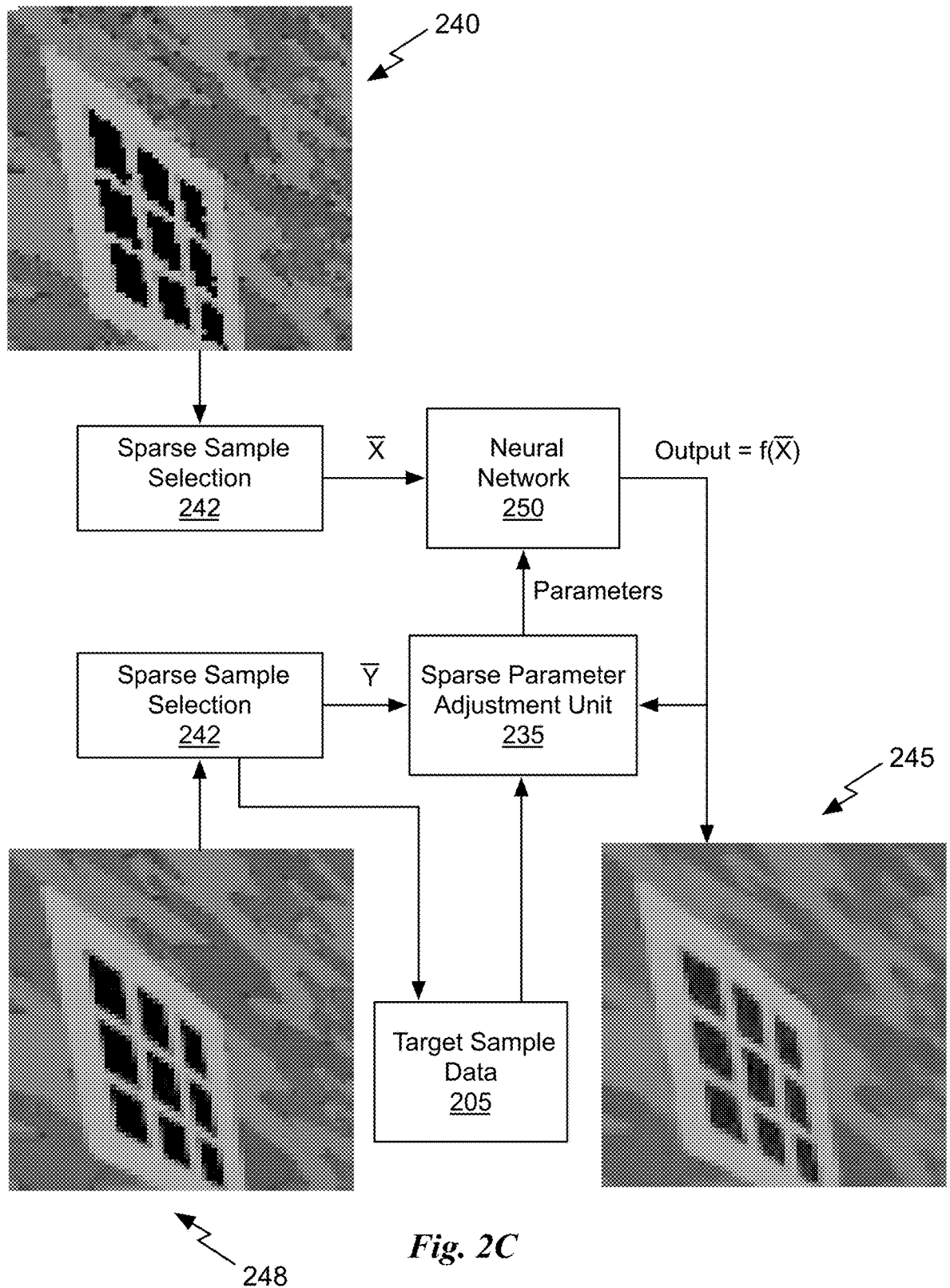
FIG. 2C illustrates a conceptual diagram of neural network training using sparse input data and sparse ground truth training targets, in accordance with one embodiment.

FIG. 2C illustrates a conceptual diagram of neural network training using sparse input data and sparse ground truth training targets, in accordance with one embodiment. A neural network 250 is trained to generate anti-aliased images. An upscaled image 240 is generated by upscaling an input image by a factor of 4 in both dimensions, so that each pixel in the sparse input vector 240 represents a 4×4 region in the input image. A random sample position is snapped to one cell in each 4×4 grid within the upscaled image 240, and the remaining 15 cells in the 4×4 grid are left black (not present) by a sparse input vector 240 to generate the sparse input vector. A target image 248 is an anti-aliased image. Sparse target vectors are generated by the sparse sample selection unit 242 by sampling the target image 248 at a rate that is less than one sample per pixel. The positions that are sampled are encoded in a bitmask that is included in target sample data 205. The bitmask may be replaced with a density mask before the target sample data 205 is provided to the sparse parameter adjustment unit 235.

During training, the neural network 250 processes the sparse input vectors and generates an output vector. The subset of samples in the output vector are compared with the sparse target vector to generate updated parameters. As previously explained, differences are computed and the differences may be scaled by a density mask to generate the updated parameters. The method 100, 160, or 210 may be used to adjust the parameter values of the neural network 250.

Figure 2D:
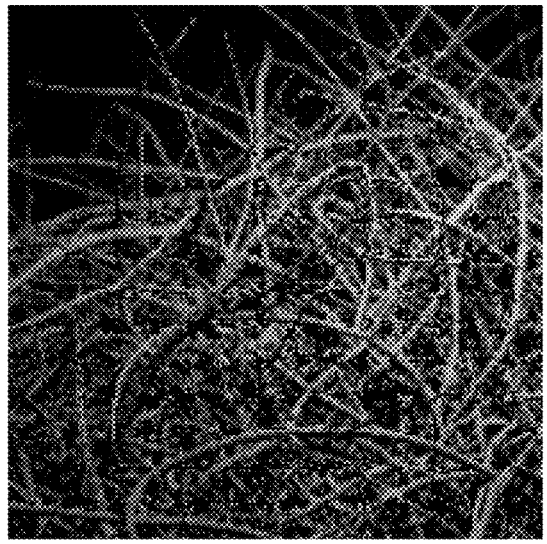
FIG. 2D illustrates sparse input data, ground truth target data, and output data of a neural network trained, using the sparse input data and sparse target data, to generate an anti-aliased image, in accordance with one embodiment.
Figure 2D:
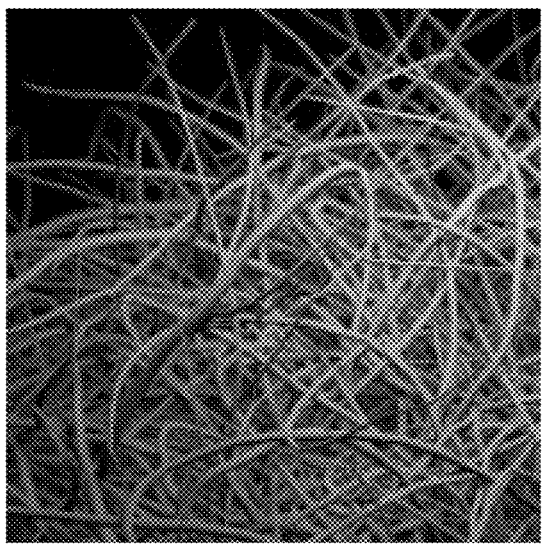
Figure 2D:
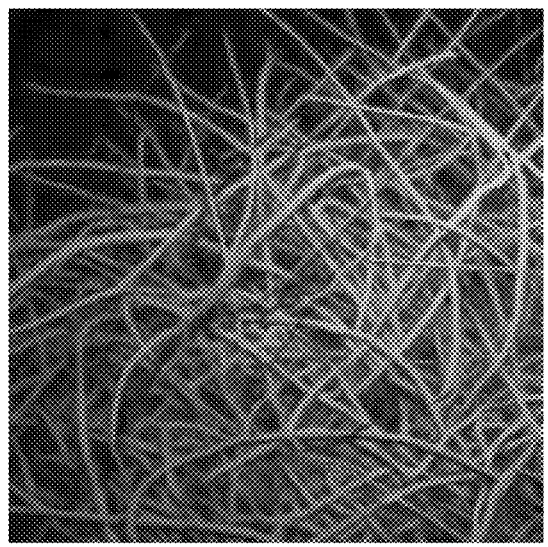

FIG. 2D illustrates sparse input data, ground truth target data, and output data of a neural network trained, using the sparse input data and sparse target data, to generate an anti-aliased image, in accordance with one embodiment.

The sparse target (and input) training dataset may be generated quickly, much faster and with fewer computations than the dense target (and input) samples. Using sparse target (and input) data instead of dense target (and input) data can drastically speed up generation of the training dataset collection, and thus the entire training process. In one embodiment, the amount of memory needed to store the training dataset in memory is reduced. Importantly, training can be performed in real-time and with significantly lower memory storage and data transfer capacity.

Parallel Processing Architecture

Figure 3:
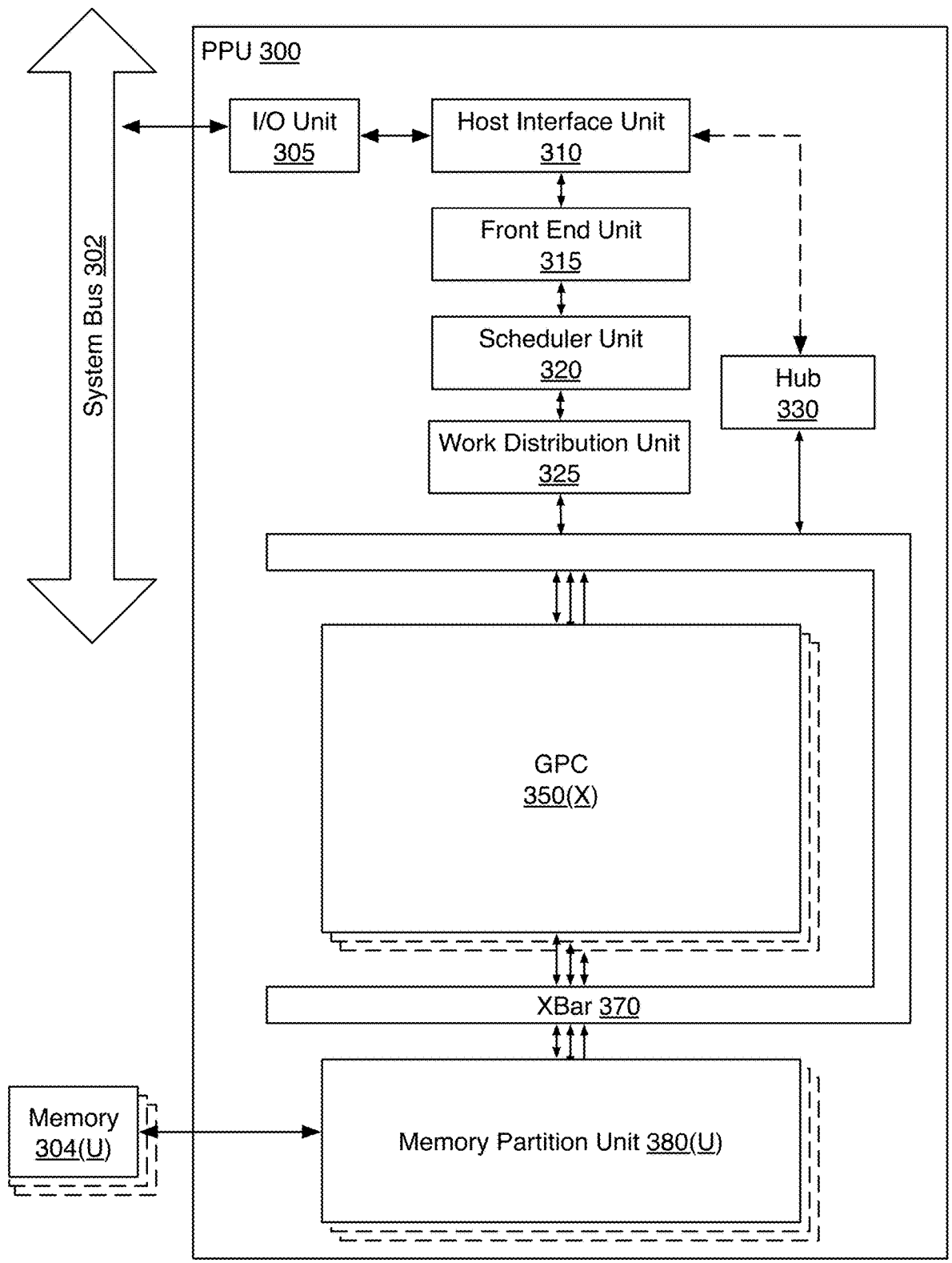
FIG. 3 illustrates a parallel processing unit, in accordance with one embodiment.

FIG. 3 illustrates a parallel processing unit (PPU) 300, in accordance with one embodiment. The PPU 300 may be configured to implement the neural network training system 150 or 250.

In one embodiment, the PPU 300 is a multi-threaded processor that is implemented on one or more integrated circuit devices. The PPU 300 is a latency hiding architecture designed to process a large number of threads in parallel. A thread (i.e., a thread of execution) is an instantiation of a set of instructions configured to be executed by the PPU 300. In one embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 3, the PPU 300 includes an Input/Output (I/O) unit 305, a host interface unit 310, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other peripheral devices via a system bus 302. The PPU 300 may also be connected to a local memory comprising a number of memory devices 304. In one embodiment, the local memory may comprise a number of dynamic random access memory (DRAM) devices.

The I/O unit 305 is configured to transmit and receive communications (i.e., commands, data, etc.) from a host processor (not shown) over the system bus 302. The I/O unit 305 may communicate with the host processor directly via the system bus 302 or through one or more intermediate devices such as a memory bridge. In one embodiment, the I/O unit 305 implements a Peripheral Component Interconnect Express (PCIe) interface for communications over a PCIe bus. In alternative embodiments, the I/O unit 305 may implement other types of well-known interfaces for communicating with external devices.

The I/O unit 305 is coupled to a host interface unit 310 that decodes packets received via the system bus 302. In one embodiment, the packets represent commands configured to cause the PPU 300 to perform various operations. The host interface unit 310 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the host interface unit 310 is configured to route communications between and among the various logical units of the PPU 300.

In one embodiment, a program executed by the host processor encodes a command stream in a buffer that provides workloads to the PPU 300 for processing. A workload may comprise a number of instructions and data to be processed by those instructions. The buffer is a region in a memory that is accessible (i.e., read/write) by both the host processor and the PPU 300. For example, the host interface unit 310 may be configured to access the buffer in a system memory connected to the system bus 302 via memory requests transmitted over the system bus 302 by the I/O unit 305. In one embodiment, the host processor writes the command stream to the buffer and then transmits a pointer to the start of the command stream to the PPU 300. The host interface unit 310 provides the front end unit 315 with pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In one embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 are coupled to the host interface unit 310. The other units may also be connected to the XBar 370 via a hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. In one embodiment, the PPU 300 includes a number U of partition units 380 that is equal to the number of separate and distinct memory devices 304 coupled to the PPU 300. A partition unit 380 will be described in more detail below in conjunction with FIG. 4B.

In one embodiment, a host processor executes a driver kernel that implements an application programming interface (API) that enables one or more applications executing on the host processor to schedule operations for execution on the PPU 300. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 4A:
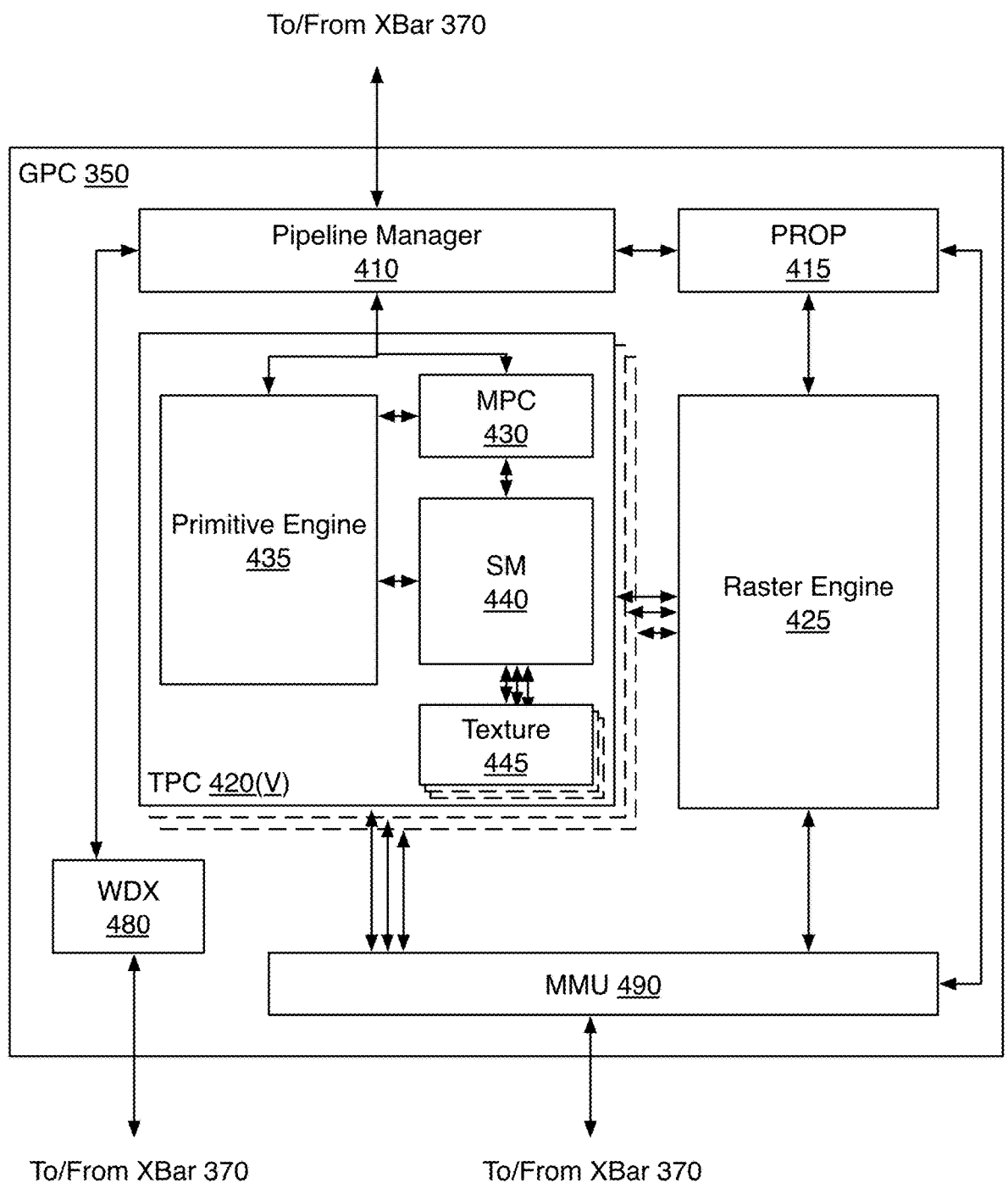
FIG. 4A illustrates a general processing cluster of the parallel processing unit of FIG. 3, in accordance with one embodiment.

FIG. 4A illustrates a GPC 350 of the PPU 300 of FIG. 3, in accordance with one embodiment. As shown in FIG. 4A, each GPC 350 includes a number of hardware units for processing tasks. In one embodiment, each GPC 350 includes a pipeline manager 410, a pre-raster operations unit (PROP) 415, a raster engine 425, a work distribution crossbar (WDX) 480, a memory management unit (MMU) 490, and one or more Texture Processing Clusters (TPCs) 420. It will be appreciated that the GPC 350 of FIG. 4A may include other hardware units in lieu of or in addition to the units shown in FIG. 4A.

In one embodiment, the operation of the GPC 350 is controlled by the pipeline manager 410. The pipeline manager 410 manages the configuration of the one or more TPCs 420 for processing tasks allocated to the GPC 350. In one embodiment, the pipeline manager 410 may configure at least one of the one or more TPCs 420 to implement at least a portion of a graphics rendering pipeline. For example, a TPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the TPCs 420 for processing by the primitive engine 435 or the SM 440.

The PROP unit 415 is configured to route data generated by the raster engine 425 and the TPCs 420 to a Raster Operations (ROP) unit in the partition unit 380, described in more detail below. The PROP unit 415 may also be configured to perform optimizations for color blending, organize pixel data, perform address translations, and the like.

The raster engine 425 includes a number of fixed function hardware units configured to perform various raster operations. In one embodiment, the raster engine 425 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 425 comprises fragments to be processed, for example, by a fragment shader implemented within a TPC 420.

Each TPC 420 included in the GPC 350 includes an M-Pipe Controller (MPC) 430, a primitive engine 435, one or more SMs 440, and one or more texture units 445. The MPC 430 controls the operation of the TPC 420, routing packets received from the pipeline manager 410 to the appropriate units in the TPC 420. For example, packets associated with a vertex may be routed to the primitive engine 435, which is configured to fetch vertex attributes associated with the vertex from the memory 304. In contrast, packets associated with a shader program may be transmitted to the SM 440.

In one embodiment, the texture units 445 are configured to load texture maps (e.g., a 2D array of texels) from the memory 304 and sample the texture maps to produce sampled texture values for use in shader programs executed by the SM 440. The texture units 445 implement texture operations such as filtering operations using mip-maps (i.e., texture maps of varying levels of detail). The texture unit 445 is also used as the Load/Store path for SM 440 to MMU 490. In one embodiment, each TPC 420 includes two (2) texture units 445.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In one embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 440 may be described in more detail below in conjunction with FIG. 5.

The MMU 490 provides an interface between the GPC 350 and the partition unit 380. The MMU 490 may provide translation of virtual addresses into physical addresses, memory protection, and arbitration of memory requests. In one embodiment, the MMU 490 provides one or more translation lookaside buffers (TLBs) for improving translation of virtual addresses into physical addresses in the memory 304.

Figure 4B:
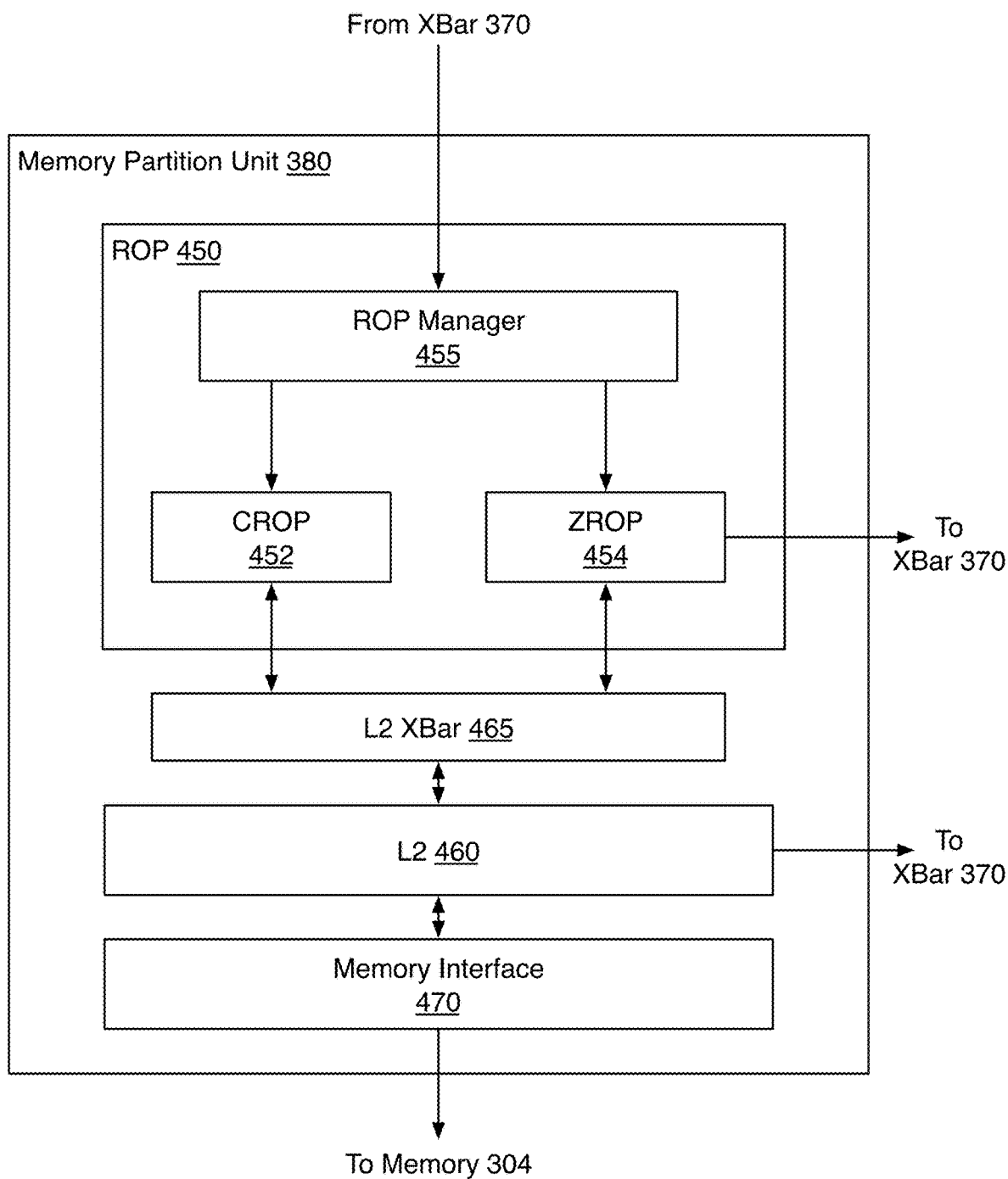
FIG. 4B illustrates a partition unit of the parallel processing unit of FIG. 3, in accordance with one embodiment.

FIG. 4B illustrates a memory partition unit 380 of the PPU 300 of FIG. 3, in accordance with one embodiment. As shown in FIG. 4B, the memory partition unit 380 includes a Raster Operations (ROP) unit 450, a level two (L2) cache 460, a memory interface 470, and an L2 crossbar (XBar) 465. The memory interface 470 is coupled to the memory 304. Memory interface 470 may implement 16, 32, 64, 128-bit data buses, or the like, for high-speed data transfer. In one embodiment, the PPU 300 comprises U memory interfaces 470, one memory interface 470 per partition unit 380, where each partition unit 380 is connected to a corresponding memory device 304. For example, PPU 300 may be connected to up to U memory devices 304, such as graphics double-data-rate, version 5, synchronous dynamic random access memory (GDDR5 SDRAM). In one embodiment, the memory interface 470 implements a DRAM interface and U is equal to 8.

In one embodiment, the PPU 300 implements a multi-level memory hierarchy. The memory 304 is located off-chip in SDRAM coupled to the PPU 300. Data from the memory 304 may be fetched and stored in the L2 cache 460, which is located on-chip and is shared between the various GPCs 350. As shown, each partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 includes a ROP Manager 455, a Color ROP (CROP) unit 452, and a Z ROP (ZROP) unit 454. The CROP unit 452 performs raster operations related to pixel color, such as color compression, pixel blending, and the like. The ZROP unit 454 implements depth testing in conjunction with the raster engine 425. The ZROP unit 454 receives a depth for a sample location associated with a pixel fragment from the culling engine of the raster engine 425. The ZROP unit 454 tests the depth against a corresponding depth in a depth buffer for a sample location associated with the fragment. If the fragment passes the depth test for the sample location, then the ZROP unit 454 updates the depth buffer and transmits a result of the depth test to the raster engine 425. The ROP Manager 455 controls the operation of the ROP unit 450. It will be appreciated that the number of partition units 380 may be different than the number of GPCs 350 and, therefore, each ROP unit 450 may be coupled to each of the GPCs 350. Therefore, the ROP Manager 455 tracks packets received from the different GPCs 350 and determines which GPC 350 that a result generated by the ROP unit 450 is routed to. The CROP unit 452 and the ZROP unit 454 are coupled to the L2 cache 460 via an L2 XBar 465.

Figure 5:
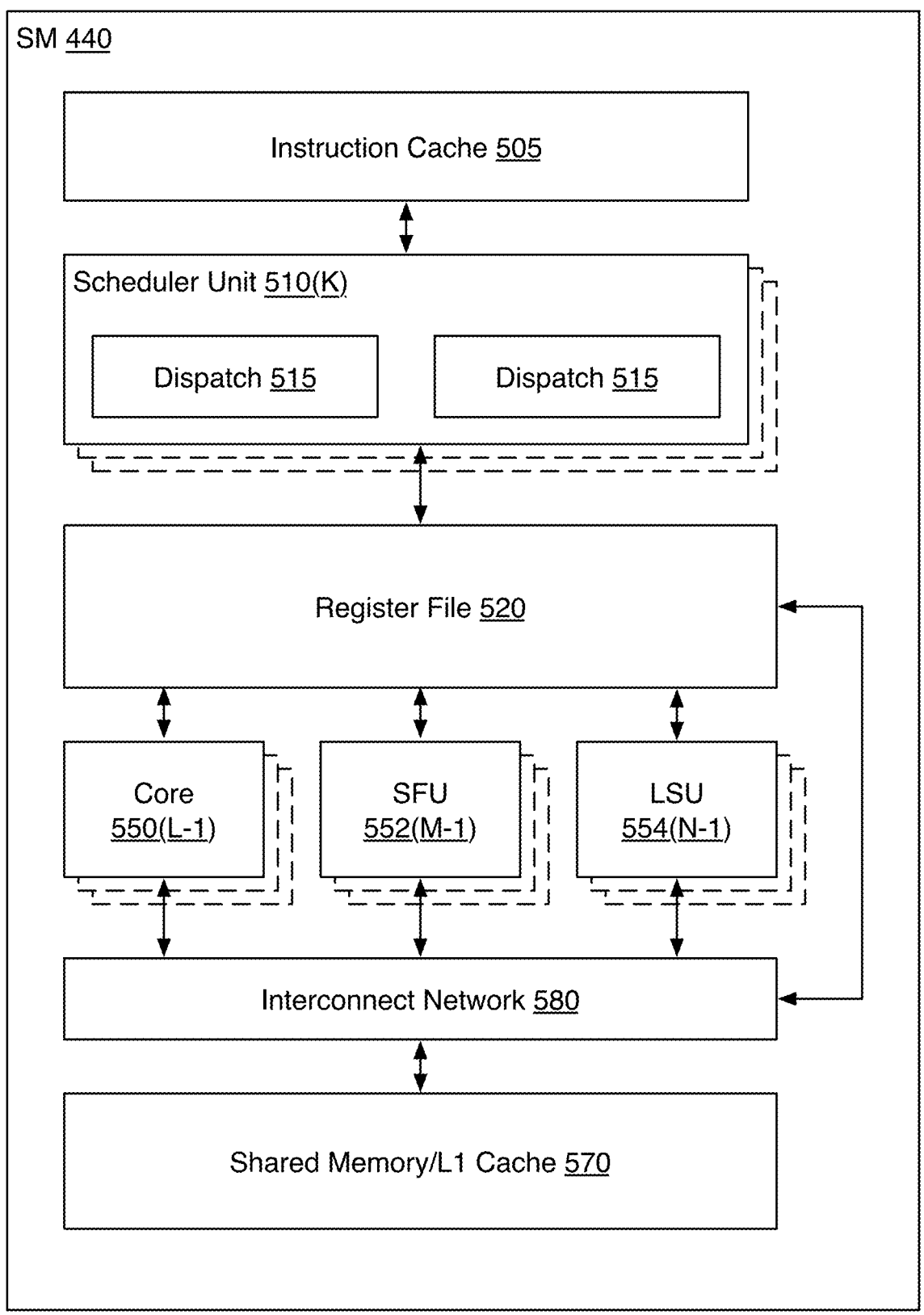
FIG. 5 illustrates the streaming multi-processor of FIG. 4A, in accordance with one embodiment.

FIG. 5 illustrates the streaming multi-processor 440 of FIG. 4A, in accordance with one embodiment. As shown in FIG. 5, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular TPC 420 within a GPC 350 and, if the task is associated with a shader program, the task may be allocated to an SM 440. The scheduler unit 510 receives the tasks from the work distribution unit 325 and manages instruction scheduling for one or more groups of threads (i.e., warps) assigned to the SM 440. The scheduler unit 510 schedules threads for execution in groups of parallel threads, where each group is called a warp. In one embodiment, each warp includes 32 threads. The scheduler unit 510 may manage a plurality of different warps, scheduling the warps for execution and then dispatching instructions from the plurality of different warps to the various functional units (i.e., cores 550, SFUs 552, and LSUs 554) during each clock cycle.

In one embodiment, each scheduler unit 510 includes one or more instruction dispatch units 515. Each dispatch unit 515 is configured to transmit instructions to one or more of the functional units. In the embodiment shown in FIG. 5, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In one embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In one embodiment, the SM 440 includes a large number (e.g., 128, etc.) of distinct processing cores 550. Each core 550 may include a fully-pipelined, single-precision processing unit that includes a floating point arithmetic logic unit and an integer arithmetic logic unit. The core 550 may also include a double-precision processing unit including a floating point arithmetic logic unit. In one embodiment, the floating point arithmetic logic units implement the IEEE 754-2008 standard for floating point arithmetic. Each SM 440 also comprises M SFUs 552 that perform special functions (e.g., attribute evaluation, reciprocal square root, and the like), and N LSUs 554 that implement load and store operations between the shared memory/L1 cache 570 and the register file 520. In one embodiment, the SM 440 includes 128 cores 550, 32 SFUs 552, and 32 LSUs 554.

Each SM 440 includes an interconnect network 580 that connects each of the functional units to the register file 520 and the LSU 554 to the register file 520, shared memory/L1 cache 570. In one embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In one embodiment, the shared memory/L1 cache 570 comprises 64 KB of storage capacity and is in the path from the SM 440 to the partition unit 380. The shared memory/L1 cache 570 can be used to cache reads and writes.

The PPU 300 described above may be configured to perform highly parallel computations much faster than conventional CPUs. Parallel computing has advantages in graphics processing, data compression, biometrics, stream processing algorithms, and the like.

When configured for general purpose parallel computation, a simpler configuration can be used. In this model, as shown in FIG. 3, fixed function graphics processing units are bypassed, creating a much simpler programming model. In this configuration, the work distribution unit 325 assigns and distributes blocks of threads directly to the TPCs 420. The threads in a block execute the same program, using a unique thread ID in the calculation to ensure each thread generates unique results, using the SM 440 to execute the program and perform calculations, shared memory/L1 cache 570 communicate between threads, and the LSU 554 to read and write Global memory through partition shared memory/L1 cache 570 and partition unit 380.

When configured for general purpose parallel computation, the SM 440 can also write commands that scheduler unit 320 can use to launch new work on the TPCs 420. In one embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (i.e., pixel data for each of the pixels of the display).

An application writes model data for a scene (i.e., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In one embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (i.e., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 300 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 300 is embodied on a single semiconductor substrate. In another embodiment, the PPU 300 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 300 may be included on a graphics card that includes one or more memory devices 304 such as GDDR5 SDRAM. The graphics card may be configured to interface with a PCIe slot on a motherboard of a desktop computer that includes, e.g., a northbridge chipset and a southbridge chipset. In yet another embodiment, the PPU 300 may be an integrated graphics processing unit (iGPU) included in the chipset (i.e., Northbridge) of the motherboard.

Various programs may be executed within the PPU 300 in order to implement and train the various neural network models 122, 125, 180, 200, and 250. For example, the device driver may launch a kernel on the PPU 300 to implement at least one neural network layer on one SM 440 (or multiple SMs 440). The device driver (or the initial kernel executed by the PPU 300) may also launch other kernels on the PPU 300 to perform other layers of the neural network. In addition, some of the neural network layers may be implemented on fixed unit hardware implemented within the PPU 300.

Exemplary System

Figure 6:
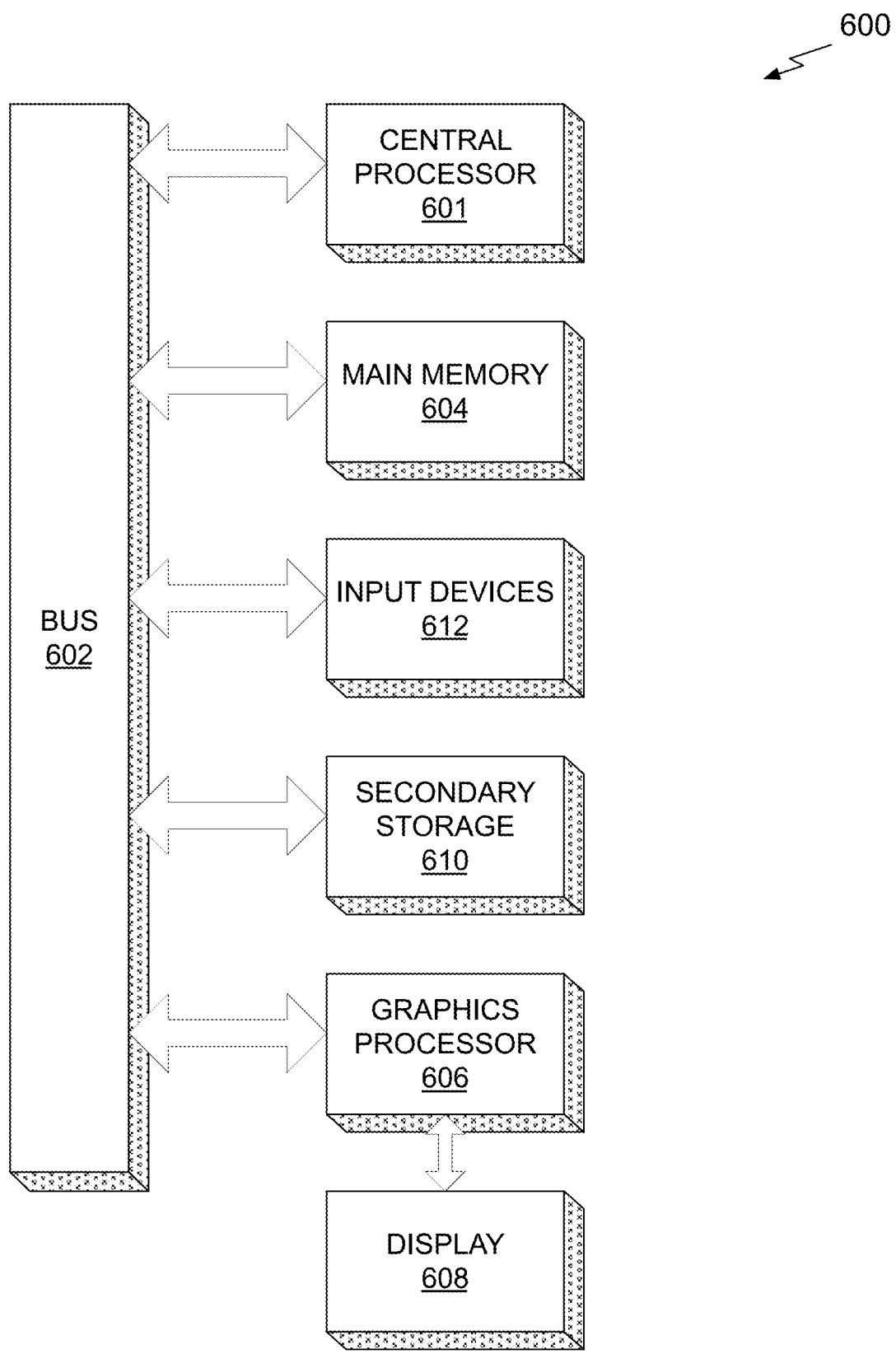
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. The exemplary system 600 may be used to implement the neural network training systems 150 and/or 200.

As shown, a system 600 is provided including at least one central processor 601 that is connected to a communication bus 602. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s). The system 600 also includes a main memory 604. Control logic (software) and data are stored in the main memory 604 which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, and the like. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 604 and/or the secondary storage 610. Such computer programs, when executed, enable the system 600 to perform various functions. The memory 604, the storage 610, and/or any other storage are possible examples of computer-readable media. Data streams associated with gestures may be stored in the main memory 604 and/or the secondary storage 610.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, and/or any other type of logic. Still yet, the system 600 may take the form of various other devices including, but not limited to a personal digital assistant (PDA) device, a mobile phone device, a television, a head mounted display, an autonomous vehicle, a virtual reality system, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for training a neural network model, comprising:
   selecting an input vector from a set of training data that includes input vectors having respective sparse target vectors, wherein each sparse target vector includes target data corresponding to a subset of samples within an output vector of the neural network model;
   processing the input vector by the neural network model to produce output data for the subset of the samples within the output vector; and
   adjusting parameter values of the neural network model to reduce differences between the output vector and a sparse target vector corresponding to the input vector for the subset of the samples.

2. The computer-implemented method of claim 1, wherein the input vector is lower resolution than the output vector.

3. The computer-implemented method of claim 1, wherein each sparse target vector is different than the other sparse target vectors in the set of training data.

4. The computer-implemented method of claim 1, wherein the input vector includes input data for a second subset of the samples within the output vector.

5. The computer-implemented method of claim 4, wherein the second subset of the samples is not correlated with the subset of the samples.

6. The computer-implemented method of claim 1, wherein a density mask indicating strengths of samples in the subset of the samples is used to scale the differences.

7. The computer-implemented method of claim 6, wherein the density mask corresponding to each one of the sparse target vectors vary.

8. The computer-implemented method of claim 1, wherein a portion of the differences are computed for each one of the samples in the subset of the samples and a remaining portion of the differences for remaining samples-of-the-samples that are not included in the subset of the samples are set to zero.

9. The computer-implemented method of claim 1, wherein a bitmask indicating positions of samples in the subset of the samples is used to compute the differences.

10. The computer-implemented method of claim 9, wherein the bitmask bitmask-corresponding to each one of the sparse target vectors vary.

11. The computer-implemented method of claim 1, wherein positions corresponding to samples in the subset of the samples in each one of the sparse target vectors vary.

12. The computer-implemented method of claim 1, further comprising:
   repeating, for at least one additional output vector, selecting the input vector and processing the input vector; and
   before adjusting the parameter values, combining the differences for the output vector and additional differences for the at least one additional output vector and then adjusting the parameter values of the neural network model to reduce the combined differences.

13. A system, comprising:
   a memory storing a set of training data that includes input vectors and having respective sparse target vectors, wherein each sparse target vector includes target data corresponding to a subset of samples within an output vector of the neural network model;
   a parallel processing unit that is coupled to the memory, wherein the memory includes instructions that, as a result of being executed by one or more processors, cause the system to:
      select an input vector from the set of training data;
      process the input vector by the neural network model to produce output data for the subset of the samples within the output vector; and
      adjust parameter values of the neural network model to reduce differences between the output vector and a sparse target vector corresponding to the input vector for the subset of the samples.

14. The system of claim 13, wherein the input vector is lower resolution than the output vector.

15. The system of claim 13, wherein each sparse target vector is different than the other sparse target vectors in the set of training data.

16. The system of claim 13, wherein the input vector includes input data for a second subset of the samples within the output vector.

17. The system of claim 16, wherein the second subset of the samples is not correlated with the subset of the samples.

18. The system of claim 13, wherein a density mask indicating strengths of samples in the subset of the samples is used to scale the differences.

19. A non-transitory computer-readable media storing computer instructions for training a neural network model that, when executed by a processor, cause the processor to perform the steps of:
   selecting an input vector from a set of training data that includes input vectors having respective sparse target vectors, wherein each sparse target vector includes target data corresponding to a subset of samples within an output vector of the neural network model;
   processing the input vector by the neural network model to produce output data for the subset of the samples within the output vector; and
   adjusting parameter values of the neural network model to reduce differences between the output vector and a sparse target vector corresponding to the input vector for the subset of the samples.

20. The non-transitory computer-readable media of claim 19, wherein the input vector includes input data for a second subset of the samples within the output vector.

* * * * *